No. 677,211. Patented June 25, 1901.
J. R. HAYES.
PLATE LIFTER.
(Application filed Apr. 6, 1901.)

(No Model.)

Witnesses
Elmer Seavey
C. D. Davis

Inventor
Joseph R. Hayes
By R. W. Bishop
Attorney

THE NORRIS PETERS CO., PHOTO-LITHO., WASHINGTON, D. C.

UNITED STATES PATENT OFFICE.

JOSEPH R. HAYES, OF MYSTIC, SOUTH DAKOTA.

PLATE-LIFTER.

SPECIFICATION forming part of Letters Patent No. 677,211, dated June 25, 1901.

Application filed April 6, 1901. Serial No. 54,666. (No model.)

*To all whom it may concern:*

Be it known that I, JOSEPH R. HAYES, a citizen of the United States of America, residing at Mystic, in the county of Pennington and State of South Dakota, have invented certain new and useful Improvements in Plate-Lifters, of which the following is such a full, clear, and exact description as will enable others skilled in the art to which it appertains to make and use the same, reference being had to the accompanying drawings, forming a part hereof.

The object of this invention is to provide a cheap and simple device by the use of which hot plates may be readily lifted and carried.

This object is accomplished by the provision of a device consisting of a pair of hooks adapted to engage under the edge of the plate and a lever or cam-handle fulcrumed on the said hooks and adapted to engage the upper side of the edge of the plate, so as to clamp the plate against the hooks.

Such a device is illustrated in the accompanying drawings, and the invention consists in certain novel features of the same, as will be hereinafter first fully described and then particularly pointed out in the claims.

Figure 1:
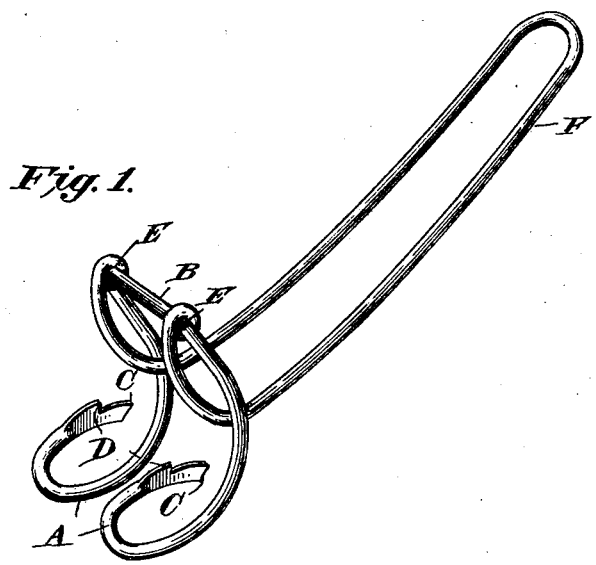
Figure 2:
Figure 3:
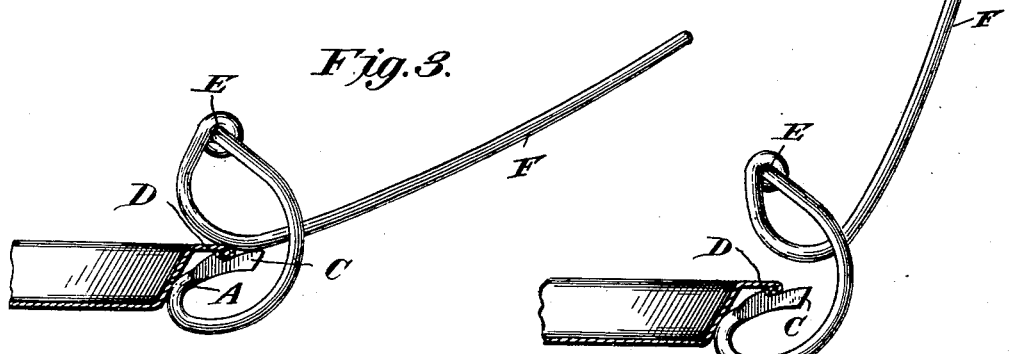
Figure 4:
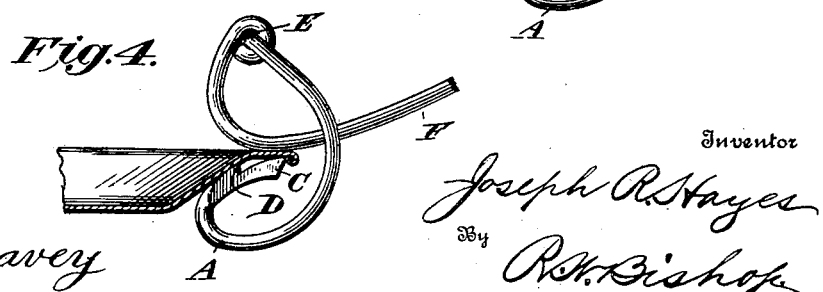

In the drawings, Figure 1 is a perspective view of a plate-lifter constructed in accordance with my invention. Fig. 2 is a side elevation of the device, showing the edge of a plate engaged by the lifting-hooks, but the lever-handle raised. Fig. 3 is a similar view showing the lever-handle turned down, so as to clamp the edge of the plate and permit lifting of the same; and Fig. 4 is a detail view showing the device engaging a plate of a different shape.

A plate-lifter embodying my invention consists of two members, each member presenting a single integral structure. One member is formed so as to present a pair of hooks A, connected by a cross-bar or shoulder B, and the shanks of the hooks being curved, as clearly shown in Figs. 2 and 3, so as to extend around the edge of the plate. The ends of the hooks are turned inward and pointed, as shown at C, and near their extremities on their upper edges I form the teeth D. The lever or handle member of the device consists of a bail having eyes E at its ends, formed around the shoulder B of the hooks, so as to fulcrum the said handle on the said shoulder. The sides of the bail or handle are bent around adjacent to the fulcrum-eyes, as shown at F, so that when the handle is swung downward the said portion will act as a cam to bear upon the edge of the plate and bind the same against the hooks.

The construction of the device being thus made known, the manner of using the same will be readily understood. When it is desired to lift a plate from a stove, for instance, the device is held in the position shown in Fig. 2 and the hooks brought into position, as shown in said figure, passing around the edge of the plate. The handle is then swung downward to the position shown in Fig. 3, this action bringing the cam portion of the handle into play against the upper side of the plate and binding the edge of the plate firmly against the said cam portion and the hooks. The lever will also be brought into an approximately horizontal position to serve as a handle by which the plate may be carried to a table or cupboard.

It will be noticed that if the rim of the plate is narrow the teeth D will engage the bead, and if the rim is wider the pointed ends C of the hooks will engage the bead, so that the device will readily engage and hold plates of different sizes. The bends of the hooks adjacent to the teeth or the pointed ends C bear against the beveled or dished portion of the plate, and thereby support the same, so as to relieve the strain on the teeth or points, and consequently prevent the punching of holes in the rim.

It will be seen at once that I have provided a very cheap and simple device by which hot plates may be readily carried without fear of burning or scorching the hand.

Having thus described my invention, what I claim, and desire to secure by Letters Patent, is—

1. A plate-lifter consisting of a pair of hooks connected by a cross-bar or shoulder and adapted to engage the under face of a plate, and a lever or handle having eyes at its end encircling the said cross-bar or shoulder and having a cam portion adjacent to said eyes adapted to bear upon the upper face of the plate.

2. A plate-lifter consisting of a pair of curved hooks having teeth on their upper edges near their ends, and a lever fulcrumed on the said hooks and adapted to bind the edge of a plate against the same.

In testimony whereof I have signed this specification in the presence of two subscribing witnesses.

JOSEPH R. HAYES.

Witnesses:
J. C. McDowel,
J. W. Fowler.